United States Patent
Lee et al.

(10) Patent No.: US 9,612,045 B2
(45) Date of Patent: Apr. 4, 2017

(54) HEAT RECOVERY APPARATUS

(71) Applicant: LG CHEM, LTD., Seoul (KR)

(72) Inventors: Sung Kyu Lee, Daejeon (KR); Joon Ho Shin, Daejeon (KR); Tae Woo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/392,187

(22) PCT Filed: Jun. 20, 2014

(86) PCT No.: PCT/KR2014/005474
§ 371 (c)(1),
(2) Date: Dec. 23, 2015

(87) PCT Pub. No.: WO2014/208938
PCT Pub. Date: Dec. 31, 2014

(65) Prior Publication Data
US 2016/0187036 A1    Jun. 30, 2016

(30) Foreign Application Priority Data

Jun. 24, 2013  (KR) .................. 10-2013-0072552
Jun. 20, 2014  (KR) .................. 10-2014-0075678

(51) Int. Cl.
| | | |
|---|---|---|
| F25D 17/02 | (2006.01) | |
| F25B 27/02 | (2006.01) | |
| B01D 3/00 | (2006.01) | |
| F24H 4/04 | (2006.01) | |
| F25B 30/02 | (2006.01) | |
| F25B 27/00 | (2006.01) | |
| F25B 1/10 | (2006.01) | |
| F25B 25/00 | (2006.01) | |

(52) U.S. Cl.
CPC .............. *F25B 27/02* (2013.01); *B01D 3/007* (2013.01); *F24H 4/04* (2013.01); *F25B 1/10* (2013.01);
(Continued)

(58) Field of Classification Search
USPC ....................................... 62/98, 115
See application file for complete search history.

(56) References Cited

U.S. PATENT DOCUMENTS

| | | | |
|---|---|---|---|
| 4,226,606 A | 10/1980 | Yaeger et al. | |
| 4,445,461 A * | 5/1984 | Farnia ............... | F22B 1/1838 122/420 |

(Continued)

FOREIGN PATENT DOCUMENTS

| | | |
|---|---|---|
| CN | 1415901 A | 5/2003 |
| CN | 201059819 Y | 5/2008 |

(Continued)

OTHER PUBLICATIONS

Translations of the foreign patents.*

*Primary Examiner* — Lauren Crane
(74) *Attorney, Agent, or Firm* — Dentons US LLP (57) ABSTRACT

The present application relates to a heat recovery apparatus and a method thereof, according to the heat recovery apparatus and a method thereof according to an embodiment of the present application, steam of 120° C. or more may be generated using only one heat exchanger using waste heat of a low-grade heat source in the state of a sensible heat of 70° C. or more discharged in industrial sites or various chemical processes, for example, such as a manufacturing process of petrochemicals, and the generated steam may also be used in various processes, and thus the use of high temperature steam which is an external heat source to be used in a reactor or a distillation column may be decreased, thereby maximizing energy saving efficiency.

24 Claims, 2 Drawing Sheets

(52) U.S. Cl.
CPC .............. *F25B 27/00* (2013.01); *F25B 30/02*
(2013.01); *F24D 2200/16* (2013.01); *F25B 25/005* (2013.01); *F25B 27/005* (2013.01); *F25B 2339/047* (2013.01); *F25B 2700/197* (2013.01); *F25B 2700/1931* (2013.01); *F25B 2700/21152* (2013.01); *F25B 2700/21161* (2013.01); *F25B 2700/21174* (2013.01); *F25B 2700/21175* (2013.01); *Y02P 20/124* (2015.11); *Y02P 70/34* (2015.11)

(56) References Cited

U.S. PATENT DOCUMENTS 5,186,013 A * 2/1993 Durso .................. F01D 15/005
62/115
2012/0023982 A1 2/2012 Berson et al.

FOREIGN PATENT DOCUMENTS

| | | |
|---|---|---|
| CN | 201255500 Y | 6/2009 |
| CN | 102226604 A | 10/2011 |
| JP | 05-223204 A | 8/1993 |
| JP | 2001-207960 A | 8/2001 |
| JP | 2007-205657 A | 8/2007 |
| JP | 2007-231866 A | 9/2007 |
| JP | 4989905 B2 | 9/2007 |
| JP | 2007231866 A * | 9/2007 |
| JP | 2010-53765 A | 3/2010 |
| JP | 2010-82112 A | 4/2010 |
| JP | 2010-164223 A | 7/2010 |
| JP | 2012-32136 A | 2/2012 |
| JP | 2012-154532 A | 8/2012 |
| JP | 2012-189079 A | 10/2012 |
| KR | 2003-0053986 A | 7/2003 |
| KR | 10-0443815 B1 | 8/2004 |
| KR | 100443815 B1 * | 8/2004 |
| KR | 10-2005-0081866 A | 8/2005 |

* cited by examiner

HEAT RECOVERY APPARATUS

This application is a National Stage Entry of International Application No. PCT/KR2014/005474, filed on Jun. 20, 2014, and claims the benefit of and priority to Korean Application No. 10-2013-0072552, filed on Jun. 24, 2013, and Korean Application No. 10-2014-0075678, filed on Jun. 20, 2014, all of which are hereby incorporated by reference in their entirety for all purposes as if fully set forth herein.

TECHNICAL FIELD

The present application relates to a heat recovery apparatus and a method thereof.

BACKGROUND ART

Figure 1:
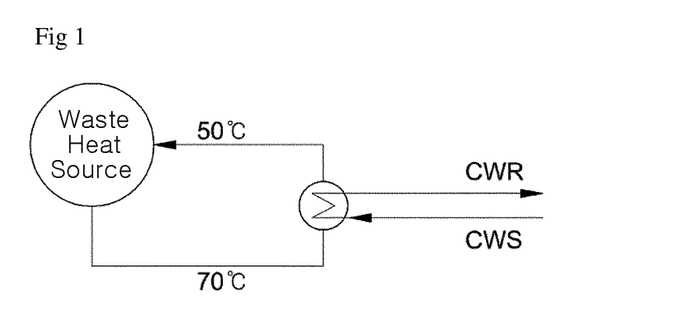
FIG. 1 is a view schematically showing a conventional waste heat disposal device.

In a general chemical process, heat exchange is performed in various paths through a reactor or a distillation column, and waste heat generated after the heat exchange may be reused or discarded. For example, as shown in FIG. 1, when the waste heat is a low-grade heat source in the state of a sensible heat of about 70° C. or more, for example, 70 to 90° C., a temperature is too low to substantially reuse, and thus the waste heat of condensation by condensate water is discarded.

Meanwhile, steam is used for various purposes in industrial fields, and particularly, in the chemical process, high temperature steam is mainly used. The high temperature steam is generally heats water in atmospheric pressure and room temperature states to the evaporation point thereof, and high pressure is applied to the water turned to steam to increase internal energy, thereby generating the high temperature steam. Here, a large amount of energy is required to be consumed to evaporate water in a liquid state.

DISCLOSURE

Technical Problem

The present application is directed to providing a heat recovery apparatus and a method thereof.

Technical Solution

The present application relates to a heat recovery apparatus. According to the heat recovery apparatus in the embodiment of the present application, high temperature steam of 120° C. or more may be generated by only one heat exchanger using waste heat of a low-grade heat source in the state of a sensible heat of 70° C. or more discharged in industrial sites or various chemical processes, for example, such as a manufacturing process of petrochemicals, the generated steam may also be used in various processes, and thus the use of high temperature steam which is an external heat source to be used in a reactor or a distillation column may be decreased, thereby maximizing energy saving efficiency.

Hereinafter, various embodiments of the present application will be described in conjunction with the accompanying drawings, but the accompanying drawings are exemplary, and the scope of the heat recovery apparatus according to the embodiment of the present application is not limited thereto.

Figure 2:
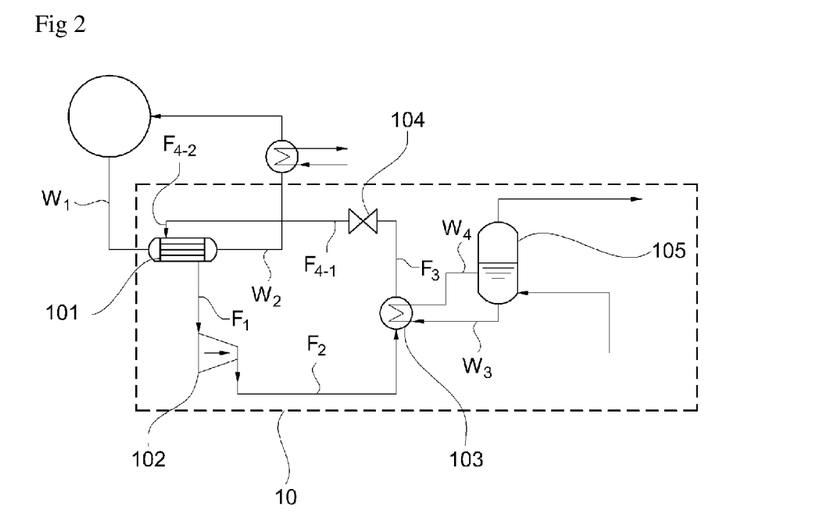
FIG. 2 is a view schematically illustrating a heat recovery apparatus according to an embodiment of the present application.

FIG. 2 is a view schematically illustrating an exemplary heat recovery apparatus 10 according to an embodiment of the present application.

As shown in FIG. 2, the heat recovery apparatus 10 according to the embodiment of the present application includes a first heat exchanger 101, a compressor 102, a second heat exchanger 103, and a pressure drop device 104. The first heat exchanger 101, the compressor 102, the second heat exchanger 103, and the pressure drop device 104 may be connected through a pipe, and preferably, may be fluidically connected to flow a refrigerant or a fluid through the pipe. Particularly, the pipe through which the refrigerant flows may be a circulation loop or circulation system in which the first heat exchanger 101, the compressor 102, the second heat exchanger 103, and the pressure drop device 104 are connected to sequentially circulate the refrigerant.

A flow rate of the refrigerant flow circulating through the pipe may be in the range of 5,000 to 231,000 kg/hr, for example, in the range of 10,000 to 150,000 kg/hr, or in the range of 30,000 to 200,000 kg/hr, and preferably, in the range of 25,000 to 100,000 kg/hr, but is not limited thereto.

The first heat exchanger 101 is included in the heat recovery apparatus 10 according to the embodiment of the present application in order to heat-exchange the refrigerant flow with the fluid flow flowing from the outside. Through the heat exchange, the refrigerant is evaporated, and the refrigerant with a vapor phase flow having a temperature relatively higher than that of the refrigerant flow flowing into the first heat exchanger may flow out of the first heat exchanger 101. In the above description, a "vapor phase" denotes a state in which a gas component flow of the total components of the refrigerant flow is rich, and for example, denotes a state in which a mol fraction of the gas component flow is in the range of 0.9 to 1.0.

A fluid flow $W_1$ flowing into the first heat exchanger 101, for example, may be a waste heat flow or a flow of condensate water passed through a condenser, and the waste heat flow, for example, may be cooling water of an exothermic reactor, but is not limited thereto. In the embodiment of the present application, the waste heat flow of a low-grade heat source in the state of a sensible heat, particularly, having a temperature of about 70° C. or more, for example, of 70 or more and less than 100° C., or in the range of 70 to 90° C. may be preferably used.

For example, the refrigerant flow $F_{4-2}$ and the fluid flow $W_1$, for example, the waste heat flow may flow into the first heat exchanger 101 through the fluidically connected pipe, the inflow refrigerant flow $F_{4-2}$ and fluid flow $W_1$ are heat-exchanged with each other in the first heat exchanger 101, and then each may flow out of the first heat exchanger 101 through the fluidically connected pipe.

A temperature of the refrigerant flow $F_{4-2}$ flowing into the first heat exchanger 101 may be a temperature lower than a temperature of the fluid flow $W_1$ flowing into the first heat exchanger 101, for example, in the range of 60 to 95° C., 70 to 80° C., 75 to 85° C., or 73 to 77° C., but is not limited thereto.

A pressure of the refrigerant flows $F_{4-2}$ and $F_1$ flowing in and out of the first heat exchanger 101 may vary according to a type of a refrigerant and driving condition, and is not particularly limited. For example, the pressure of the refrigerant flows $F_{4-2}$ and $F_1$ flowing in and out of the first heat exchanger 101 may be in the range of 3.0 to 20.0 kgf/cm² g, for example, in the range of 4.0 to 10.0 kgf/cm² g, or in the range of 5.0 to 7.0 kgf/cm² g, but is not limited thereto. When the pressure of the refrigerant flow is adjusted to the range of 3.0 to 20.0 kgf/cm² g, a compression ratio of the compressor may be easily adjusted. Generally, an outflow pressure is determined by the temperature, but when an inflow pressure increases, the compression ratio may be maintained low. As the compression ratio increases, high temperature steam may be generated from a low temperature heat source, but in this case, a coefficient of performance decreases, and as the compression ratio decreases, the coefficient of performance increases, but there is a problem in that it is difficult to generate high temperature steam from the low temperature heat source.

A pressure of the fluid flows $W_1$ and $W_2$ flowing in and out of the first heat exchanger 101 is not particularly limited, for example, may be in the range of 0.5 to 2.0 kgf/cm² g, and for example, may be in the range of 0.7 to 1.5 kgf/cm² g, or in the range of 0.8 to 1.2 kgf/cm² g.

Further, a flow rate of the fluid flow $W_1$ flowing into the first heat exchanger 101 may be 50,000 kg/hr or more, for example, 100,000 kg/hr or more, or 1,000,000 kg/hr or more, preferably, 500,000 kg/hr or more, but is not limited thereto. As the flow rate of the fluid flow $W_1$ flowing into the first heat exchanger 101 increases, an outflow temperature of the fluid flow $W_2$ is maintained at a high temperature after heat transfer even when the same quantity of heat is transferred by the refrigerant, and thus the outflow temperature of the refrigerant flow $F_1$ flowing out of the first heat exchanger may be maintained at a high temperature. Accordingly, the upper limit of the flow rate of the fluid flow $W_1$ flowing into the first heat exchanger 101 is not particularly limited, and in consideration of efficiency of the device and economic efficiency, for example, may be 2,300,000 kg/hr or less, or 1,000,000 kg/hr or less, but is not limited thereto.

The first heat exchanger 101 denotes a device or machine which performs heat exchange between the flowing fluids, and in the embodiment, the first heat exchanger 101 may be an evaporator which evaporates the liquid phase refrigerant flow into the vapor phase refrigerant flow.

The compressor 102 is included in the heat recovery apparatus 10 according to the embodiment of the present application in order to compress the refrigerant flow $F_1$ flowing out of the first heat exchanger 101 and to increase a temperature and pressure thereof, and the vapor phase refrigerant flow $F_2$ having relatively higher temperature and pressure than those of the refrigerant flow which is compressed by passing through the compressor 102 and flows out of the first heat exchanger may flow into the second heat exchanger 103 having a relatively high pressure which will be described below.

For example, the refrigerant flow $F_1$ flowing out of the first heat exchanger 101 may flow into the compressor 102 through a fluidically connected pipe, the inflow refrigerant flow $F_1$ may be compressed in the compressor 102, and then may flow out through the fluidically connected pipe.

In the embodiment, a pressure ratio of the refrigerant flow $F_1$ flowing out of the first heat exchanger 101 to the refrigerant flow $F_2$ flowing out of the compressor 102 may satisfy the following Expression 1.

$2 \leq P_C/P_H \leq 5$  [Expression 1]

In Expression 1, $P_C$ denotes a pressure of the refrigerant flow $F_2$ flowing out of the compressor 102, and $P_H$ denotes a pressure of the refrigerant flow $F_1$ flowing out of the first heat exchanger 101.

That is, the pressure ratio $P_C/P_H$ of the refrigerant flow $F_1$ flowing out of the first heat exchanger 101 to the refrigerant flow $F_2$ flowing out of the compressor 102 may be in the range of 2 to 5, for example, in the range of 2 to 4, and preferably, may be adjusted to the range of 3 to 4.

When the pressure ratio $P_C/P_H$ of the refrigerant flow $F_1$ flowing out of the first heat exchanger 101 to the refrigerant flow $F_2$ flowing out of the compressor 102 satisfies Expression 1, the refrigerant evaporated in the first heat exchanger 101 may be compressed in the state of high temperature and high pressure to have a sufficient amount of heat to heat-exchange with the fluid flow passing through the second heat exchanger which will be described below. Particularly, in the heat recovery apparatus according to the embodiment of the present application, when the pressure ratio of the refrigerant flow $F_1$ flowing out of the first heat exchanger 101 to the refrigerant flow $F_2$ flowing out of the compressor 102 is adjusted to the above-described range, high temperature steam of 120° C. or more may be generated through a heat exchange process using only one heat exchanger without a separate steam generating device or additional heat supply, and thus high temperature steam may be efficiently generated. Further, an additional steam generating device or a device for supplying heat is not required, and thus an initial system cost may be reduced.

The pressure ratio $P_C/P_H$ of the refrigerant flow $F_1$ flowing out of the first heat exchanger 101 to the refrigerant flow $F_2$ flowing out of the compressor 102 may be, but is not particularly limited to, variously adjusted according to applicability to a type of the process and condition of each process, as long as the pressure ratio satisfies Expression 1. In the embodiment, the pressure of the refrigerant flow $F_1$ flowing out of the first heat exchanger 101 may be in the range of 3.0 to 20.0 kgf/cm² g, for example, in the range of 4.0 to 15.0 kgf/cm² g, or in the range of 5.0 to 12.0 kgf/cm² g, but is not limited thereto. Further, the pressure of the refrigerant flow $F_2$ flowing out of the compressor 102 may be in the range of 9.0 to 62.5 kgf/cm² g, for example, in the range of 15 to 45 kgf/cm² g, in the range of 18 to 35 kgf/cm² g, or in the range of 20 to 25 kgf/cm² g, but is not limited thereto.

Further, a temperature of the refrigerant flow $F_2$ compressed in and flowing out of the compressor 102 may be in the range of 125 to 185° C., for example, in the range of 130 to 175° C., or in the range of 135 to 165° C., but is not limited thereto.

As the compressor 102, any various compressing device well-known in the technical field may be used as long as the compressing device may compress the vapor phase flow, and in the embodiment, the compressing device may be a compressor, but is not limited thereto.

In the embodiment, a temperature of the refrigerant flow $F_1$ flowing out of the first heat exchanger 101 and a temperature of the fluid flow $W_1$ flowing into the first heat exchanger 101 may satisfy the following Expression 2.

$1° C. \leq T_F - T_R \leq 20° C.$  [Expression 2]

In Expression 2, $T_F$ denotes the temperature of the fluid flow $W_1$ flowing into the first heat exchanger 101, and $T_R$ denotes the temperature of the refrigerant flow $F_1$ flowing out of the first heat exchanger 101.

That is, the difference $T_F - T_R$ of the temperature of the refrigerant flow $F_1$ flowing out of the first heat exchanger 101 and the temperature of the fluid flow $W_1$ flowing into the first heat exchanger 101 may be adjusted in the range of 1 to 20° C., for example, 1 to 15° C., 2 to 20° C., 1 to 10° C., or 2 to 10° C.

When the temperature of the refrigerant flow $F_1$ flowing out of the first heat exchanger 101 and the temperature of the fluid flow $W_1$ flowing into the first heat exchanger 101 satisfies Expression 2, high temperature steam may be generated using the low temperature waste heat, particularly, of 70° C. or more, for example, the waste heat of the low-grade heat source in the state of the sensible heat in the range of 70 to 100° C.

The temperature of the refrigerant flow $F_1$ flowing out of the first heat exchanger 101 and the temperature of the fluid flow $W_1$ flowing into the first heat exchanger 101 may be, but is not particularly limited to, variously adjusted according to applicability to the type of the process and condition of each process, as long as the temperature satisfies Expression 2. In the embodiment, the temperature of the fluid flow $W_1$ flowing into the first heat exchanger 101 may be in the range of 70 to 100° C., for example, 80 to 100° C., 70 to 90° C., 75 to 85° C., or 85 to 95° C., but is not limited thereto. Further, the temperature of the refrigerant flow $F_1$ flowing out of the first heat exchanger 101 may be in the range of 65 to 95° C., 70 to 90° C., 70 to 95° C., or 70 to 85° C., but is not limited thereto.

Here, the temperature of the fluid flow $W_2$ flowing out after the heat-exchange with the refrigerant flow in the first heat exchanger 101 may be in the range of 68 to 102° C., for example, 68 to 98° C., 73 to 88° C., 73 to 98° C., or 73 to 82° C., but is not limited thereto.

The second heat exchanger 103 is included in the heat recovery apparatus 10 according to the embodiment of the present application in order to heat-exchange the refrigerant flow $F_2$ flowing out of the compressor 102 with the fluid flow $W_3$ flowing from the outside. Through the heat exchange, the evaporated refrigerant with a liquid phase flow having a temperature relatively lower than that of the refrigerant flow flowing out of the compressor may flow out, and the fluid flow $W_3$ may absorb the latent heat generated upon condensation of the refrigerant. In the above description, a "liquid phase" denotes a state in which a liquid component flow of the total components of the refrigerant flow is rich, and for example, denotes a state in which a mol fraction of the liquid component flow is in the range of 0.9 to 1.0.

In the embodiment, a fluid flowing into the second heat exchanger 103 may be water (make-up water), and here, the water heat-exchanged in the second heat exchanger 103 may absorb the latent heat generated upon condensation of the refrigerant and evaporate, and then may be discharged as steam.

For example, the refrigerant flow $F_2$ flowing out of the compressor 102 and the fluid flow $W_3$ to heat-exchange with the refrigerant flow $F_2$ may flow into the second heat exchanger 103 through the fluidically connected pipe, and after the refrigerant flow $F_2$ and the fluid flow $W_3$ flowing in are heat-exchanged with each other in the second heat exchanger 103, each may flow out of the second heat exchanger 103 through the fluidically connected pipe.

The temperature and pressure of the fluid flow $W_3$ flowing into the second heat exchanger 103 are not particularly limited, and the fluid flow having a wide range of temperature and pressure may flow into the second heat exchanger 103. For example, the fluid flow $W_3$ having a temperature in the range of 70 to 105° C., for example, 80 to 105° C., or 90 to 100° C., and the pressure in the range of 0.99 to 10.5 kgf/cm$^2$ g, for example, 1.2 to 8.5 kgf/cm$^2$ g may flow into the second heat exchanger 103.

Further, the flow rate of the fluid flow $W_3$ flowing into the second heat exchanger 103 may be, but is not particularly limited to, in the range of 500 to 10,000 kg/hr, for example, 1,000 to 9,000 kg/hr, 1,500 to 7,500 kg/hr, or, 3,000 to 5,000 kg/hr.

In the embodiment, the refrigerant $F_2$ at a high temperature and high pressure flowing out of the compressor 102 and water $W_4$ which is heat-exchanged in the second heat exchanger 103 may flow out of the second heat exchanger 103 as steam of 120° C. or more, for example, 120° C. or more, 145° C. or more, or 165° C. or more, the upper limit of the temperature of the steam varies according to the use of the steam, and may be, but is not particularly limited to, 400° C. or less, for example, 300° C. or less, 200° C. or less, or 185° C. or less. Further, the refrigerant $F_2$ at a high temperature and high pressure flowing out of the compressor 102 and water $W_4$ which is heat-exchanged in the second heat exchanger 103 may flow out of the second heat exchanger 103 as the steam having a pressure of 0.99 to 10.5 kgf/cm$^2$ g, for example, 1.2 to 8.5 kgf/cm$^2$ g.

Further, the refrigerant flow $F_3$ which is heat-exchanged with the fluid flow $W_3$ in the second heat exchanger 103 and has a temperature of 125 to 190° C., for example, 125 to 170° C. or 120 to 160° C., or preferably 118 to 140° C. may flow out of the second heat exchanger 103, but is not limited thereto. The pressure of the refrigerant flow $F_3$ which is heat-exchanged with the fluid flow $W_3$ in the second heat exchanger 103 may vary according to a type of the refrigerant and driving condition, and for example, the refrigerant flow $F_3$ having the pressure of 9 to 62.5 kgf/cm$^2$ g, 15 to 45 kgf/cm$^2$ g, 18 to 35 kgf/cm$^2$ g, or 20 to 25 kgf/cm$^2$ g may flow out of the second heat exchanger 103, but is not limited thereto.

The second heat exchanger 103 denotes a device or machine which performs heat exchange between the flowing fluids, and in the embodiment, the second heat exchanger 103 may be a condenser which condenses the vapor phase refrigerant flow into the liquid phase refrigerant flow.

Further, the exemplary heat recovery apparatus 10 according to the embodiment of the present application may additionally include a storage tank 105. As shown in FIG. 2, the storage tank 105 may be configured to be fluidically connected to the second heat exchanger 103 through the pipe. The storage tank 105 is a device to supply the fluid flow flowing into the second heat exchanger 103, and in the storage tank 105, as a fluid for flowing into the second heat exchanger 103, for example, water may be stored.

The fluid flow $W_3$ flowing out of the storage tank 105 may flow into the second heat exchanger 103 through the pipe, and may be heat-exchanged with the refrigerant flow $F_2$ flowing into the second heat exchanger 103. Here, the heat-exchanged fluid flow $W_4$, for example, water in high temperature and high pressure states reflows into the storage tank 105 and is decompressed, and may be discharged as steam.

Further, although not shown, the heat recovery apparatus 10 according to the embodiment of the present application may additionally include one or more steam compressors compressing the steam. For example, the heat recovery apparatus 10 may additionally include one or more steam compressors which are connected to the pipe through which the fluid flow flowing out of the second heat exchanger flows, for example, a first steam compressor, a second steam compressor and/or a third steam compressor. The steam may be divided into several grades according to a temperature and pressure, and the steam divided into various grades each may be applied to a different process according to the temperature and pressure. For example, the steam may be divided into a high pressure steam at a temperature of 280° C. or more and a pressure of more than 30 kgf/cm$^2$ g, a middle pressure steam at a temperature of 160 to 180° C. and a pressure of 5.3 to 9.2 kgf/cm$^2$ g, and a low pressure steam at a temperature of 120 to 140° C. or more and a pressure of 0.99 to 2.6 kgf/cm$^2$ g according to the pressure thereof. In order to produce steam of each desired grade, the steam flowing out of the second compressor after the heat exchange therein in the embodiment of the present application may be compressed and discharged through an additional steam compressor.

In the embodiment, the steam flowing out of the second heat exchanger may be the low pressure steam, and may be divided and discharged as the middle pressure steam and/or the high pressure steam by passing through the additional first steam compressor and second steam compressor, respectively.

Further, in the embodiment, the heat recovery apparatus according to the embodiment of the present application may additionally include one or more steam condensers to condense the steam of each grade, for example, a first steam condenser, a second steam condenser and/or a third steam condenser.

For example, when the heat recovery apparatus according to the embodiment of the present application includes the first steam condenser, the second steam condenser, and the third condenser, the high pressure steam may be condensed and discharged as the middle pressure steam through the first steam condenser, the middle pressure steam may be condensed and discharged as the low pressure steam through the second steam condenser, and the low pressure steam may be condensed and discharged as a very low pressure steam through the third steam condenser. Preferably, the first steam condenser, the second steam condenser, and the third condenser may be connected to each other, and each may be connected so that the middle pressure steam discharged from the first steam condenser flows into the second steam condenser, and the low pressure steam discharged from the second steam condenser flows into the third steam condenser. Further, in the embodiment, the very low pressure steam flowing out of the third steam condenser may be a fluid flow flowing into the second heat exchanger, accordingly, the generated steam may be reused, and thus the manufacturing cost of the steam may be reduced.

The pressure drop device 104 is included in the heat recovery apparatus according to the embodiment of the present application 10 to expand a liquid phase refrigerant flow $F_3$ flowing out of the second heat exchanger 103 and decrease the temperature and pressure, and after a refrigerant flow $F_{4-1}$ passed through the pressure drop device 104 has expanded, the refrigerant flow $F_{4-1}$ in the state of a relatively lower temperature and lower pressure than those of the refrigerant flow flowing out of the second heat exchanger may reflow into the above-described first heat exchanger 101.

For example, the liquid phase refrigerant flow $F_3$ flowing out of the second heat exchanger 103 may flow into the pressure drop device 104 through the fluidically connected pipe, and after the refrigerant flow $F_3$ flowing into the pressure drop device 104 is expanded, the refrigerant flow in the state of a relatively lower temperature and lower pressure than those of the refrigerant flow flowing out of the second heat exchanger may flow out through the fluidically connected pipe. In the embodiment, the refrigerant flow $F_{4-1}$ flowing out of the pressure drop device 104 may flow out of the pressure drop device 104 while having a temperature of 65 to 105° C., for example, 65 to 100° C., or 70 to 93° C., preferably 75 to 90° C., but is not limited thereto. Further, the pressure of the refrigerant flow $F_{4-1}$ flowing out of the pressure drop device 104 may be variously modified according to a type of the refrigerant and driving condition, for example, may be in the range of 3.0 to 20.0 kgf/cm$^2$ g, for example, 4.0 to 15.0 kgf/cm$^2$ g, or 5.0 to 12.0 kgf/cm$^2$ g, preferably the refrigerant flow $F_{4-1}$ having a pressure of 6.0 to 10.0 kgf/cm$^2$ g may flow out of the pressure drop device 104, but is not limited thereto.

The pressure drop device 104, for example, may be a control valve or turbine installed in the pipe through which the refrigerant flow flows out of the second heat exchanger 103.

When the pressure drop device 104 is a turbine, the turbine may be a power generating device, for example, may be a hydraulic turbine capable of converting mechanical energy of the refrigerant flowing through the pipe, that is, the fluid, to electric power, and when the hydraulic turbine is used, electric power consumed in the compressor may be self-generated and thus the coefficient of performance of the device may increase.

In the heat recovery apparatus 10 according to the embodiment of the present application, refrigerant flow each passing through the first heat exchanger 101, the compressor 102, the second heat exchanger 103, and the pressure drop device 104 have different temperatures and pressure characteristics, and when the refrigerant flow in the vapor phase and/or liquid phase flows in or flows out of the first heat exchanger 101, the compressor 102, the second heat exchanger 103, and the pressure drop device 104, the latent heat according to the change of the temperature, pressure, and condition of the refrigerant flow may be used as a heat source for generating steam. Further, in the heat recovery apparatus 10 according to the embodiment of the present application, by setting the optimum temperature and pressure conditions to generate steam of 120° C. or more using waste heat of a low-grade heat source of 70° C. or more without a separate steam manufacturing system or device using only one heat exchanger, the steam may be generated with excellent efficiency.

In the embodiment, the refrigerant flow $F_{4-2}$ flowing into the first heat exchanger 101 may be the liquid phase flow, and a volume fraction of the liquid phase flow in the refrigerant flow may be in the range of 0.4 to 1.0, for example, 0.9 to 1.0, preferably 0.99 to 1.0.

Further, the refrigerant flow $F_2$ flowing out of the compressor 102 may be the vapor phase flow, and the volume fraction of the vapor phase flow in the refrigerant flow may be in the range of 0.7 to 0.9, for example, 0.75 to 0.85, preferably 0.8 to 0.85.

The refrigerant flow $F_3$ flowing out of the second heat exchanger 103 may be the liquid phase flow, and the volume fraction of the liquid phase flow in the refrigerant flow may be in the range of 0.8 to 1.0, for example, 0.9 to 1.0, preferably 0.99 to 1.0.

Further, the refrigerant flow flowing out of the pressure drop device 104 may be the liquid phase flow, and the volume fraction of the vapor phase flow in the refrigerant flow may be in the range of 0 to 0.6, for example, 0 to 0.3, preferably 0 to 0.1.

In the above-description, the volume fraction denotes a ratio of a volume flow rate of the liquid phase flow or vapor phase flow with respect to a total volume flow rate of the refrigerant flow flowing through the pipe, the volume flow rate denotes a volume of the fluid flowing per unit time, and may be found by the following Expression 3.

$$\text{Volume flow rate} = Av(m^3/s) \quad \text{[Expression 3]}$$

In Expression 3, A denotes a cross-sectional area (m$^2$) of the pipe, and v denotes velocity of flow (m/s) of the refrigerant flow.

In the embodiment, the coefficient of performance (COP) of the heat recovery apparatus according to the embodiment of the present application may be 3 or more. The higher value of the coefficient of performance denotes the more efficient and economic process, and when the coefficient of performance is less than 3, there may be a problem in that a production cost of the steam is excessive.

The coefficient of performance denotes a quantity of heat absorbed by the heat exchanging medium in comparison with energy input to the compressor 102, that is, denotes a ratio of energy input to recovered energy. For example, the coefficient of performance of 3 denotes that the quantity of heat three times the input electricity is gained.

The coefficient of performance may be calculated by the following Expression 4.

$$COP = \frac{Q}{W} \quad \text{[Expression 4]}$$

In Expression 4, Q denotes the quantity of heat of condensation generated in the second heat exchanger, and W denotes the amount of work done by the compressor.

In another embodiment of the present application, there is provided a heat recovery method. The exemplary heat recovery method may be performed using the above-described heat recovery apparatus 10, the steam of 120° C. may be generated by not discarding and using a low-grade heat source of 70° C. or more discharged in industrial sites or various chemical processes, for example, such as a manufacturing process of petrochemicals, the generated steam may be used in various processes, and thus the use of high temperature steam which is an external heat source to be used in a reactor or a distillation column may be decreased, thereby maximizing energy saving efficiency.

The heat recovery method according to the embodiment of the present application includes a refrigerant circulation step, a first heat-exchanging step, a second heat-exchanging step, and a pressure adjustment step.

In the embodiment, the heat recovery method includes the refrigerant circulation step in which the refrigerant flow sequentially passes through the first heat exchanger 101, the compressor 102, the second heat exchanger 103, and the pressure drop device 104. For example, the heat recovery method includes the refrigerant circulation step in which (i) the refrigerant flow flows into the first heat exchanger 101, (ii) the refrigerant flow $F_1$ flowing out of the first heat exchanger 101 flows into the compressor 102, (iii) the refrigerant flow $F_2$ flowing out of the compressor 102 flows into the second heat exchanger 103, (iv) the refrigerant flow $F_3$ flowing out of the second heat exchanger 103 flows into the pressure drop device 104, (v) the refrigerant flow $F_{4-1}$ flowing out of the pressure drop device 104 reflows into the first heat exchanger 101.

The heat recovery method includes a first heat-exchanging step in which the refrigerant flow $F_{4-2}$ flowing into the first heat exchanger 101 and the fluid flow $W_1$ flowing into the first heat exchanger 101 are heat-exchanged, and a second heat-exchanging step in which the refrigerant flow $F_2$ flowing out of the compressor 102 and the fluid flow $W_3$ flowing into the second heat exchanger 103 are heat-exchanged.

Further, the heat recovery method includes a pressure adjustment step in which a ratio of the pressure of the refrigerant flow $F_1$ flowing out of the first heat exchanger 101 to the pressure of the refrigerant flow $F_2$ flowing out of the compressor 102 is adjusted to satisfy the following Expression 1.

$$2 \leq P_C/P_H \leq 5 \quad \text{[Expression 1]}$$

In Expression 1, $P_C$ denotes the pressure of the refrigerant flow $F_2$ flowing out of the compressor 102, and $P_H$ denotes the pressure of the refrigerant flow $F_1$ flowing out of the first heat exchanger 101.

When the ratio of the pressure of the refrigerant flow $F_1$ flowing out of the first heat exchanger 101 to the pressure of the refrigerant flow $F_2$ flowing out of the compressor 102 satisfy Expression 1, high temperature steam of 120° C. or more may be generated through heat exchange process using only one heat exchanger without a separate steam generating device or additional heat supply, and thus the high temperature steam may be efficiently generated. Further, the additional steam generating device or the device for supplying heat is not required, and thus the initial system cost may be reduced.

In the heat recovery method according to the embodiment of the present application, detailed description about the pressure of the refrigerant flow $F_1$ flowing out of the first heat exchanger 101 and the pressure of the refrigerant flow $F_2$ flowing out of the compressor 102 is the same as in the above-described heat recovery apparatus 10, and thus will be omitted.

Further, in the heat recovery method according to the embodiment of the present application, detailed description about the specific temperature, pressure, and flow rate conditions is the same as in the above-described heat recovery apparatus 10, and thus will be omitted.

The refrigerant circulation step, the first heat-exchanging step, the second heat-exchanging step, and the pressure adjustment step may be sequentially performed, or each may be independently performed regardless of an order, and each of the steps may be simultaneously performed. Further, since the step of (i) to (v) of the refrigerant circulation step is a circulation step, any step may be performed first as long as the refrigerant flow circulates as described above.

In the exemplary heat recovery method according to the embodiment of the present application, a temperature of the refrigerant flow $F_1$ flowing out of the first heat exchanger 101 and a temperature of the fluid flow $W_1$ flowing into the first heat exchanger 101 may satisfy the following Expression 2.

$$1° C. \leq T_F - T_R \leq 20° C. \quad \text{[Expression 2]}$$

In Expression 2, $T_F$ denotes a temperature of the fluid flow $W_1$ flowing into the first heat exchanger 101, and $T_R$ denotes a temperature of the refrigerant flow $F_1$ flowing out of the first heat exchanger 101.

When a temperature of the refrigerant flow $F_1$ flowing out of the first heat exchanger 101 and a temperature of the fluid flow $W_1$ flowing into the first heat exchanger 101 satisfy Expression 2, steam of 120° C. or more may be generated only using one heat exchanger by using a low temperature waste heat, especially, waste heat of a low-grade heat source in the state of a sensible heat of 70° C. or more, for example, of 70 to 90° C., detailed description about temperature conditions of the refrigerant flow $F_1$ flowing out of the first heat exchanger 101 and the fluid flow $W_1$ flowing into the first heat exchanger 101 is the same as in the above-described heat recovery apparatus 10, and thus will be omitted.

Further, in the heat recovery method according to the embodiment of the present application, detailed description about the specific temperature, pressure, and flow rate conditions is the same as in the above-described heat recovery apparatus 10, and thus will be omitted.

In the embodiment, in another embodiment of the heat recovery method, the fluid $W_3$ flowing into the second heat exchanger 103 may be water, further, the exemplary heat recovery method according to the embodiment of the present application may further include a steam generation step in which water which is heat-exchanged with the refrigerant flow $F_2$ flowing into the second heat exchanger 103 is discharged as the steam. In the above description, detailed description about the temperature and pressure of the steam is the same as in the above-described heat recovery apparatus 10, and thus will be omitted.

Further, in the embodiment, the heat recovery method may further include a steam compression step. The steam compression step may be performed by the steam compressor described in the heat recovery apparatus, for example, the first steam compressor, the second steam compressor and/or the third steam compressor, detailed description thereof is the same as described above, and thus will be omitted.

The heat recovery method further includes a steam condensation step. The steam condensation step may be performed by the steam compressor described in the heat recovery apparatus, for example, the first steam the compressor, the second steam compressor and/or the third steam compressor, detailed description thereof is the same as described above, and thus will be omitted.

Further, the steam compression step and the steam condensation step may be sequentially performed after the above-described refrigerant circulation step; the first heat-exchanging step; the second heat-exchanging step, and the pressure adjustment step, or may be independently performed regardless of the order. Further, the steps may be simultaneously performed.

Figure 3:
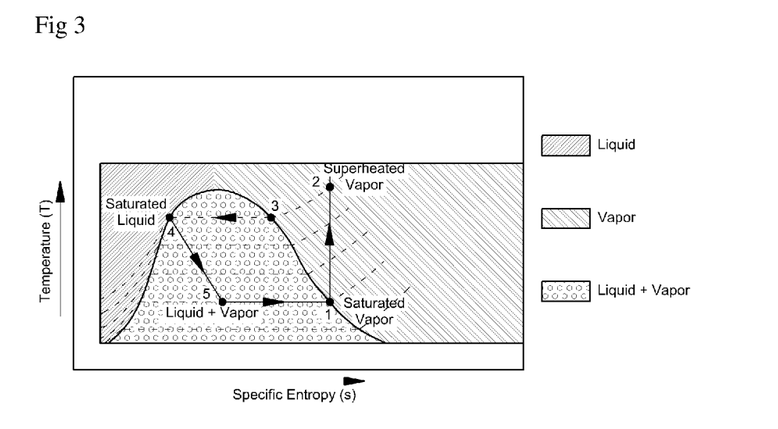
FIG. 3 is a graph exemplarily showing a temperature-entropy of the waste heat recovery apparatus and method according to the embodiment of the present application.

FIG. 3 is a line diagram of a temperature-entropy (T-s) line of the waste heat recovery apparatus and method according to the embodiment of the present application, and a dashed line in FIG. 3 shows an isobaric line.

The waste heat flow $W_1$ having a low temperature is heat-exchanged with the liquid phase refrigerant flow $F_4$ through the first heat exchanger 101, and in the line diagram of FIG. 3, heat exchange is performed along a path from 5 to 1. The vapor phase refrigerant flow $F_1$ which is heat-exchanged is compressed in the compressor 102, and here, compressed along a path from 1 to 2. The vapor phase high temperature and high pressure refrigerant flow $F_2$ compressed in the compression process flows into the second heat exchanger 103, transfers heat to a high temperature heat demander along the path from 2 to 4 in the line diagram of FIG. 3, accordingly, the liquid phase high pressure refrigerant flow $F_3$ which loses heat is expanded through the pressure drop device 104, and expanded along the path from 4 to 5 in the diagram of FIG. 3.

The heat recovery apparatus 10 and method according to the embodiment of the present application may be applied to various petrochemical processes.

For example, in the case of an iodine reaction process upon manufacturing n-butanol, the temperature of the waste heat generated in the process is about 85° C., here, the quantity of heat of about 7.6 Gcal/hr is lost, and thus the above-described heat recovery apparatus and method may be applied to the iodine reaction process. Further, in the case of the manufacturing process of cumene through an alkylation reaction, the quantity of heat of about 6.8 Gcal/hr is lost, and thus the above-described heat recovery apparatus and method may be applied to the manufacturing process of the cumene. Further, in the case of the manufacturing process of acrylic acids, the temperature of the waste heat generated in an absorber is about 75° C., here, the quantity of heat of about 1.6 to 3.4 Gcal/hr is lost, and thus the above-described heat recovery apparatus and method may be applied to the manufacturing process of the acrylic acids.

Advantageous Effects

According to the heat recovery apparatus and method in the embodiment of the present application, the steam of 120° C. or more may be generated using only one heat exchanger, and using the waste heat of the low-grade heat source in the state of a sensible heat of 70° C. or more discharged in industrial sites or various chemical processes, for example, such as the manufacturing process of petrochemicals, the generated steam may also be used in various processes, and thus the use of high temperature steam which is the external heat source to be used in the reactor or the distillation column may be decreased, thereby maximizing energy saving efficiency.

MODES OF THE INVENTION

Hereinafter, the present application will be described in greater detail in conjunction with examples according to an embodiment of the present application and comparative examples not according to the embodiment of the present application, but the scope of the present application is not limited to the following examples.

Example 1

Figure 4:
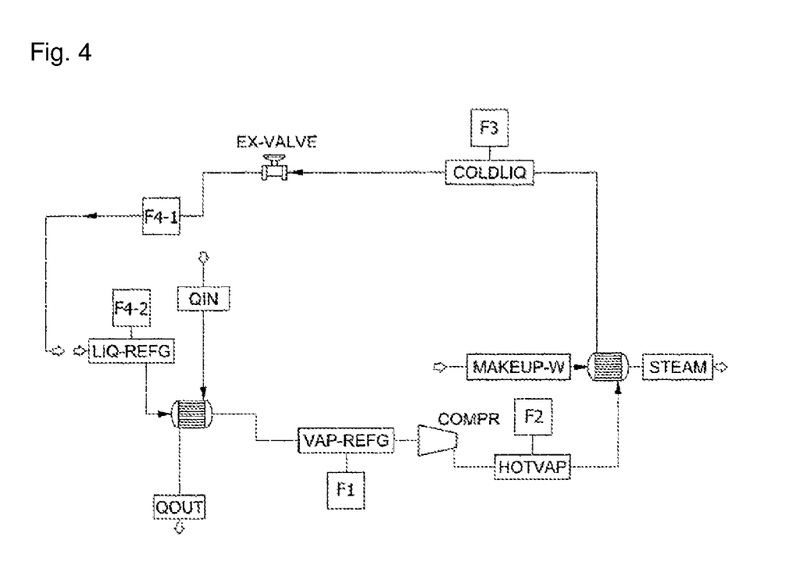
FIG. 4 is a view showing the heat recovery apparatus according to the embodiment of the present application.

Steam was generated using a heat recovery apparatus of FIG. 4.

A refrigerant (1,1,1,3,3-pentafluoropropane, R245fa) was circulated at a flow rate of 30,000 kg/hr such that the refrigerant sequentially passes through a first heat exchanger, a compressor, a second heat exchanger, and a control valve. Specifically, a refrigerant flow in the state of 75.4° C., 6.2 kgf/cm$^2$ g (7.1 bar) with a gas volume fraction of 0.0 flowed into the first heat exchanger, and at the same time, the waste heat flow in the state of 85.0° C., 1.0 kgf/cm$^2$ g (2.0 bar) with the gas volume fraction of 0.0 flowed into the first heat exchanger at a flow rate of 300,000 kg/hr for heat exchange. After the heat exchange in the first heat exchanger, the waste heat flow in the state of 83.3° C., 1.0 kgf/cm$^2$ g with the gas volume fraction of 0.0 flowed out at a flow rate of 30,000 kg/hr, the refrigerant flow in the state of 80° C., 6.2 kgf/cm$^2$ g (7.1 bar) with the gas volume fraction of 1.0 flowed out, and then the refrigerant flow flowed into the compressor. Further, the refrigerant flow compressed in the compressor flowed out of the compressor while being in the state of 127° C., 21.4 kgf/cm$^2$ g (22.0 bar) with the gas volume fraction of 0.88. Here, the amount of work used in the compressor was 220,404 W. The refrigerant flow which flowed out of the compressor flowed into the second heat exchanger, and at the same time, water in the state of 100° C., 0.99 kgf/cm² g (1.98 bar) with the gas volume fraction of 0.0 flowed into the second heat exchanger at a flow rate of 2,000 kg/hr for the heat exchange with the refrigerant flow. After the heat exchange, the water was discharged as the steam in the state of 120° C., 0.99 kgf/cm² g with the gas volume fraction of 1.0, the refrigerant flow was condensed and flowed out while being in the state of 126° C., 21.4 kgf/cm² g (22.0 bar) with the gas volume fraction of 0.0, and then flowed into the control valve. Further, the refrigerant flow which passed through the control valve flowed out of the control valve while being in the state of 75.4° C., 6.2 kgf/cm² g (7.1 bar) with the gas volume fraction of 0.66, and then reflowed into the first heat exchanger.

Here, in the pressure drop device, an electrical power of 72,874 W was generated using mechanical energy of the fluid flow. Further, coefficient of performance of the heat recovery apparatus was calculated by the following Expression 4, and shown in the following Table 1.

$$COP = \frac{Q}{W} \qquad \text{[Expression 4]}$$

In Expression 4, Q denotes the quantity of heat of condensation generated in the second heat exchanger, and W denotes the amount of work done by the compressor.

Example 2

The steam was generated in the same manner as in Example 1 except that the refrigerant flow in the state of 75.4° C., 6.2 kgf/cm² g (7.1 bar) with the gas volume fraction of 0.0 flowed into the first heat exchanger, and at the same time, the waste heat flow in the state of 95° C., 1.0 kgf/cm² g (2.0 bar), the gas volume fraction of 0.0 flowed into the first heat exchanger at a flow rate of 300,000 kg/hr for the heat exchange, the heat was exchanged in the first heat exchanger, the refrigerant flow in the state of 90° C., 6.2 kgf/cm² g (7.1 bar) with the gas volume fraction of 1.0 flowed into the compressor, the refrigerant flow compressed in the compressor flowed out of the compressor while being in the state of 133° C., 24.3 kgf/cm² g (24.8 bar) with the gas volume fraction of 1.0, the refrigerant flow flowed into the second heat exchanger and was heat-exchanged with the water of 100° C., the heat-exchanged refrigerant flow in the state of 132° C., 24.3 kgf/cm² g (24.8 bar) with the gas volume fraction of 0.0 flowed out, and flowed into the pressure drop device. Here, the coefficient of performance of the heat recovery apparatus and the temperature of the steam were shown in the following Table 1.

Example 3

The steam was generated in the same manner as in Example 1 except that the refrigerant flow in the state of 68.5° C., 5.0 kgf/cm² g (5.9 bar) with a gas volume fraction of 0.0 flowed into the first heat exchanger, and at the same time, the waste heat flow in the state of 95° C., 1.0 kgf/cm² g with the gas volume fraction of 0.0 flowed into the first heat exchanger at a flow rate of 300,000 kg/hr for the heat exchange, the heat was exchanged in the first heat exchanger, the refrigerant flow in the state of 90° C., 5.0 kgf/cm² g (5.9 bar) with the gas volume fraction of 1.0 flowed into the compressor, the refrigerant flow compressed in the compressor flowed out of the compressor while being in the state of 133° C., 24.3 kgf/cm² g (24.8 bar) with the gas volume fraction of 1.0, the refrigerant flow flowed into the second heat exchanger and was heat-exchanged with the water of 100° C., the heat-exchanged refrigerant flow in the state of 132° C., 24.3 kgf/cm² g (24.8 bar) with the gas volume fraction of 0.0 flowed out, and flowed into the pressure drop device. Here, the coefficient of performance of the heat recovery apparatus and the temperature of the steam were shown in the following Table 1.

Comparative Example 1

The steam was generated in the same manner as in Example 1 except that the refrigerant flow in the state of 79.6° C., 7.0 kgf/cm² g (7.9 bar) with the gas volume fraction of 0.0 flowed into the first heat exchanger, and at the same time, the waste heat flow in the state of 90° C., 1.0 kgf/cm² g with the gas volume fraction of 0.0 flowed into the first heat exchanger at a flow rate of 300,000 kg/hr for the heat exchange, the heat was exchanged in the first heat exchanger, the refrigerant flow in the state of 85° C., 7.0 kgf/cm² g (7.9 bar) with the gas volume fraction of 1.0 flowed into the compressor, the refrigerant flow compressed in the compressor flowed out of the compressor while being in the state of 108° C., 14.2 kgf/cm² g (15.0 bar) with the gas volume fraction of 1.0, the refrigerant flow flowed into the second heat exchanger and was heat-exchanged with water of 80° C., the heat-exchanged refrigerant flow in the state of 107° C., 14.2 kgf/cm² g (15.0 bar) with the gas volume fraction of 0.0 flowed out, and flowed into the pressure drop device. Here, the coefficient of performance of the heat recovery apparatus and the temperature of the steam were shown in the following Table 2.

Comparative Example 2

The steam was generated in the same manner as in Example 1 except that the refrigerant flow in the state of 61.9° C., 4.0 kgf/cm² g (4.9 bar) with the gas volume fraction of 0.0 flowed into the first heat exchanger, and at the same time, the waste heat flow in the state of 70° C., 1.0 kgf/cm² g with the gas volume fraction of 0.0 flowed into the first heat exchanger at a flow rate of 300,000 kg/hr for the heat exchange, the heat was exchanged in the first heat exchanger, the refrigerant flow in the state of 65° C., 4.0 kgf/cm² g (4.9 bar) with the gas volume fraction of 1.0 flowed into the compressor, the refrigerant flow compressed in the compressor flowed out of the compressor while being in the state of 134° C., 24.6 kgf/cm² g (25.2 bar) with the gas volume fraction of 1.0, the refrigerant flow flowed into the second heat exchanger and was heat-exchanged with the water of 100° C., the heat-exchanged refrigerant flow in the state of 133° C., 24.6 kgf/cm² g (25.2 bar) with the gas volume fraction of 0.0 flowed out, and flowed into the pressure drop device. Here, the coefficient of performance of the heat recovery apparatus and the temperature of the steam were shown in the following Table 2.

TABLE 1

| | | Example 1 | | Example 2 | | Example 3 | |
|---|---|---|---|---|---|---|---|
| $T_F$ (° C.) | $T_R$ (° C.) | 85 | 75.4 | 95 | 75.4 | 95 | 68.5 |
| | $T_F - T_R$ (° C.) | | 9.6 | | 19.6 | | 16.5 |

TABLE 1-continued

|  | Example 1 | Example 2 | Example 3 |
|---|---|---|---|
| $P_C$ (bar)    $P_H$ (bar) | 22    7.1 | 24.8    7.1 | 24.8    5.9 |
| $P_C/P_H$ | 3.1 | 3.5 | 4.2 |
| Q (W) | 702,874 | 678,737 | 625,323 |
| Total W (W) | 220,404 | 255,159 | 256,294 |
| COP | 3.19 | 2.67 | 2.44 |
| Steam temperature (° C.) | 120 | 120 | 120 |

TABLE 2

|  | Comparative Example 1 | Comparative Example 2 |
|---|---|---|
| $T_F$ (° C.)    $T_R$ (° C.) | 90    79.6 | 70    61.9 |
| $T_F - T_R$ (° C.) | 10.4 | 8.1 |
| $P_C$ (bar)    $P_H$ (bar) | 15.0    7.9 | 25.2    4.9 |
| $P_C/P_H$ | 1.9 | 5.14 |
| Q (W) | 38,589 | 510,992 |
| Total W (W) | 126,919 | 236,665 |
| COP | 0.30 | 2.16 |
| Steam temperature (° C.) | 103 | 120 |

The invention claimed is:

1. A heat recovery apparatus, comprising:
a first heat exchanger, a compressor, a second heat exchanger, and a pressure drop device which are fluidically connected through a pipe through which a refrigerant flows,
wherein a refrigerant flow flowing into the first heat exchanger is heat-exchanged with a fluid flow of 70° C. or more flowing into the first heat exchanger,
the refrigerant flow flowing out of the first heat exchanger flows into the compressor, the refrigerant flow flowing out of the compressor flows into the second heat exchanger, and is heat-exchanged with a fluid flow flowing into the second heat exchanger,
the refrigerant flow flowing out of the second heat exchanger flows into the pressure drop device,
the refrigerant flow flowing out of the pressure drop device reflows into the first heat exchanger, and
a ratio between a pressure of the refrigerant flow flowing out of the first heat exchanger and a pressure of the refrigerant flow flowing out of the compressor satisfies the following Expression 1:

$$3.1 \leq P_C/P_H \leq 4.2 \quad \text{[Expression 1]}$$

where, in Expression 1, $P_C$ denotes a pressure of the refrigerant flow flowing out of the compressor, and $P_H$ denotes a pressure of the refrigerant flow flowing out of the first heat exchanger,
wherein the fluid flowing into the second heat exchanger is water, and the water which is heat-exchanged in the second heat exchanger is discharged as steam, and
wherein a temperature of the steam is 120° C. or more.

2. The heat recovery apparatus of claim 1, wherein the fluid flow flowing into the first heat exchanger is a waste heat flow or a flow of condensate passed through a condenser.

3. The heat recovery apparatus of claim 1, wherein a temperature of the refrigerant flow flowing out of the first heat exchanger and a temperature of the fluid flow flowing into the first heat exchanger satisfy the following Expression 2:

$$1° C. \leq T_F - T_R \leq 20° C. \quad \text{[Expression 2]}$$

where, in Expression 2, $T_F$ denotes a temperature of the fluid flow flowing into the first heat exchanger, and $T_R$ denotes a temperature of the refrigerant flow flowing out of the first heat exchanger.

4. The heat recovery apparatus of claim 1, wherein a flow rate of the refrigerant is in the range of 5,000 to 231,000 kg/hr.

5. The heat recovery apparatus of claim 1, wherein a temperature of the refrigerant flow flowing into the first heat exchanger is in the range of 60 to 105° C.

6. The heat recovery apparatus of claim 1, wherein a flow rate of the fluid flow flowing into the first heat exchanger is in the range of 50,000 to 2,300,000 kg/hr.

7. The heat recovery apparatus of claim 1, wherein a temperature of the fluid flow flowing out of the first heat exchanger is in the range of 68 to 102° C.

8. The heat recovery apparatus of claim 1, wherein a temperature of the refrigerant flow flowing out of the first heat exchanger is in the range of 65 to 105° C.

9. The heat recovery apparatus of claim 1, wherein a pressure of the refrigerant flow flowing out of the first heat exchanger is in the range of 3.0 to 20.0 kgf/cm²g.

10. The heat recovery apparatus of claim 1, wherein a temperature of the refrigerant flow flowing out of the compressor is in the range of 125 to 185° C.

11. The heat recovery apparatus of claim 1, wherein a pressure of the refrigerant flow flowing out of the compressor is in the range of 9.0 to 62.5 kgf/cm²g.

12. The heat recovery apparatus of claim 1, wherein a flow rate of the fluid flow flowing into the second heat exchanger is in the range of 500 to 10,000 kg/hr.

13. The heat recovery apparatus of claim 1, wherein a temperature of the water flowing into the second heat exchanger is in the range of 70 to 105° C.

14. The heat recovery apparatus of claim 1, wherein a pressure of the steam is in the range of 0.99 to 10.5 kgf/cm²g.

15. The heat recovery apparatus of claim 1, further comprising one or more steam compressors configured to compress the steam.

16. The heat recovery apparatus of claim 1, further comprising one or more steam condensers configured to condense the steam.

17. The heat recovery apparatus of claim 1, wherein a temperature of the refrigerant flow flowing out of the second heat exchanger is in the range of 125 to 190° C.

18. The heat recovery apparatus of claim 1, wherein a temperature of the refrigerant flow flowing out of the pressure drop device is in the range of 65 to 105° C.

19. A heat recovery method, comprising:
a refrigerant circulation step in which a refrigerant flow flows into a first heat exchanger, the refrigerant flow flowing out of the first heat exchanger flows into a compressor, the refrigerant flow flowing out of the compressor flows into a second heat exchanger, the refrigerant flow flowing out of the second heat exchanger flows into a pressure drop device, and the refrigerant flow flowing out of the pressure drop device flows into the first heat exchanger;
a first heat exchange step in which the refrigerant flow flowing into the first heat exchanger is heat-exchanged with a fluid flow of 70° C. or more flowing into the first heat exchanger;
a second heat exchange step in which the refrigerant flow flowing out of the compressor exchanger is heat-exchanged with a fluid flow of flowing into the second heat exchanger; and a pressure adjustment step in which a ratio between a pressure of the refrigerant flow flowing out of the first heat exchanger and a pressure of the refrigerant flow flowing out of the compressor is adjusted to satisfy the following Expression 1:

$$3.1 \leq P_C/P_H \leq 4.2 \quad \text{[Expression 1]}$$

where, in Expression 1, $P_C$ denotes a pressure of the refrigerant flow flowing out of the compressor, and $P_H$ denotes a pressure of the refrigerant flow flowing out of the first heat exchanger, wherein the fluid flowing into the second heat exchanger is water, and the water which is heat-exchanged in the second heat exchanger is discharged as steam, and wherein a temperature of the steam is 120° C. or more.

20. The heat recovery method of claim 19, wherein the fluid flow flowing into the first heat exchanger is a waste heat flow or a flow of condensate passed through a condenser.

21. The heat recovery method of claim 19, further comprising adjusting a temperature of the refrigerant flow flowing out of the first heat exchanger and a temperature of the fluid flow flowing into the first heat exchanger to satisfy the following Expression 2:

$$1° \text{C.} \leq T_F - T_R \leq 20° \text{C.} \quad \text{[Expression 2]}$$

where, in Expression 2, $T_F$ denotes a temperature of the fluid flow flowing into the first heat exchanger, and $T_R$ denotes a temperature of the refrigerant flow flowing out of the first heat exchanger.

22. The heat recovery method of claim 19, wherein a pressure of the steam is in the range of 0.99 to 10.5 kgf/cm²g.

23. The heat recovery method of claim 19, further comprising compressing the steam.

24. The heat recovery method of claim 19, further comprising condensing the steam.

* * * * *